United States Patent [19]

Lefter

[11] 4,364,417
[45] Dec. 21, 1982

[54] PIPE RUPTURE RESTRAINT AND JET SHIELD DIFFUSER ASSEMBLY

[75] Inventor: Jan D. Lefter, Bayside, N.Y.

[73] Assignee: NPS Technologies, Inc., Secaucus, N.J.

[21] Appl. No.: 179,441

[22] Filed: Aug. 19, 1980

[51] Int. Cl.³ .............................................. F16L 57/00
[52] U.S. Cl. ..................................... 138/42; 138/103; 138/148
[58] Field of Search ................... 138/148, 149, 42, 97, 138/103, 110

[56] References Cited

U.S. PATENT DOCUMENTS

| | | | |
|---|---|---|---|
| 3,610,538 | 10/1971 | Enders . | |
| 3,695,301 | 10/1972 | Pittman . | |
| 3,860,039 | 1/1975 | Ells | 138/103 |
| 3,873,030 | 3/1975 | Barragan | 138/42 |
| 3,896,999 | 7/1975 | Barragan | 138/42 |
| 4,148,341 | 4/1979 | Lundbohm . | |
| 4,176,691 | 12/1979 | Jude et al. | 138/103 |
| 4,184,564 | 1/1980 | Trainor . | |
| 4,199,853 | 4/1980 | Fricker | 138/110 |
| 4,259,553 | 3/1981 | Tanaka et al. . | |
| 4,267,699 | 5/1981 | Bahrenburg | 138/97 |

Primary Examiner—Robert I. Smith
Attorney, Agent, or Firm—Robert H. Epstein

[57] ABSTRACT

A pipe rupture restraint and shield diffuser assembly is installed on a pipe at a location where the pipe is subject or postulated to rupture and includes a cylindrical casing surrounding the pipe and having holes therethrough and a plurality of diffuser rings disposed in longitudinally spaced relation in an annular space between the casing and the pipe to form flow obstructions along the annular space whereby upon rupture of the pipe jet flow is diffused by flow past the diffuser rings and through the holes in the casing. The assembly can be attached directly around the pipe or can be independently supported.

16 Claims, 10 Drawing Figures

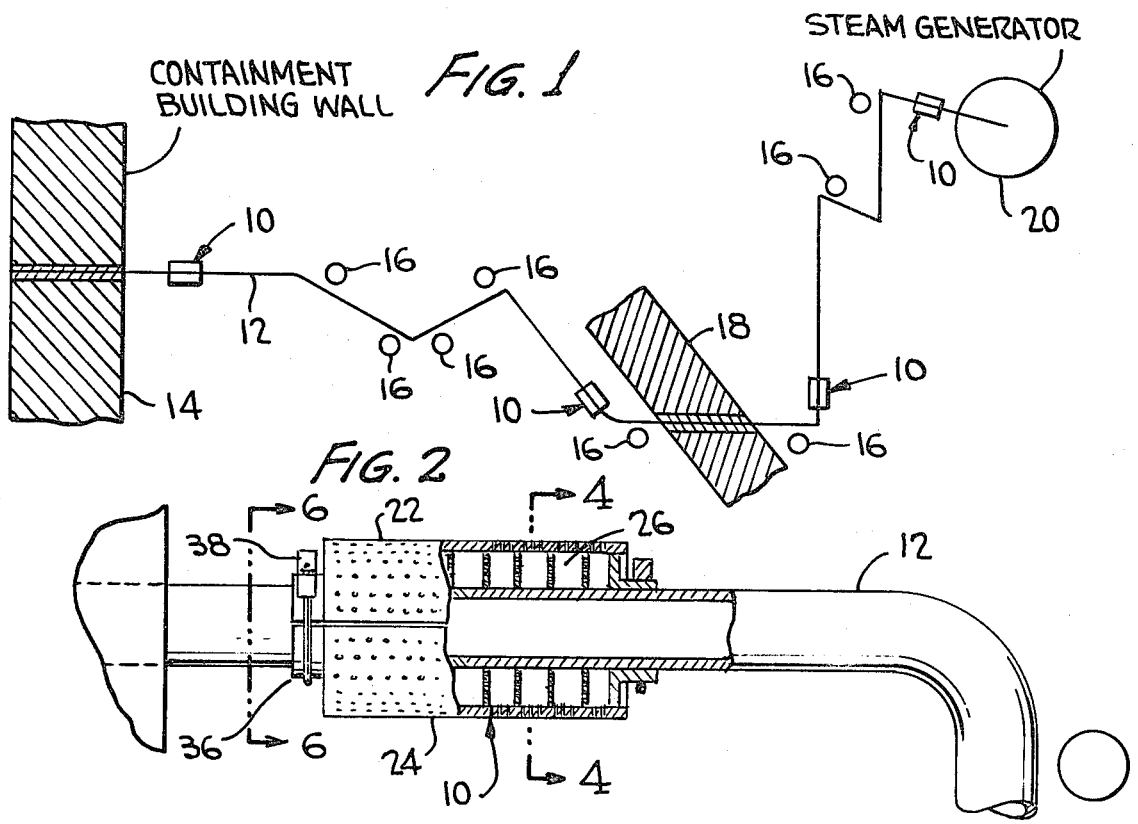
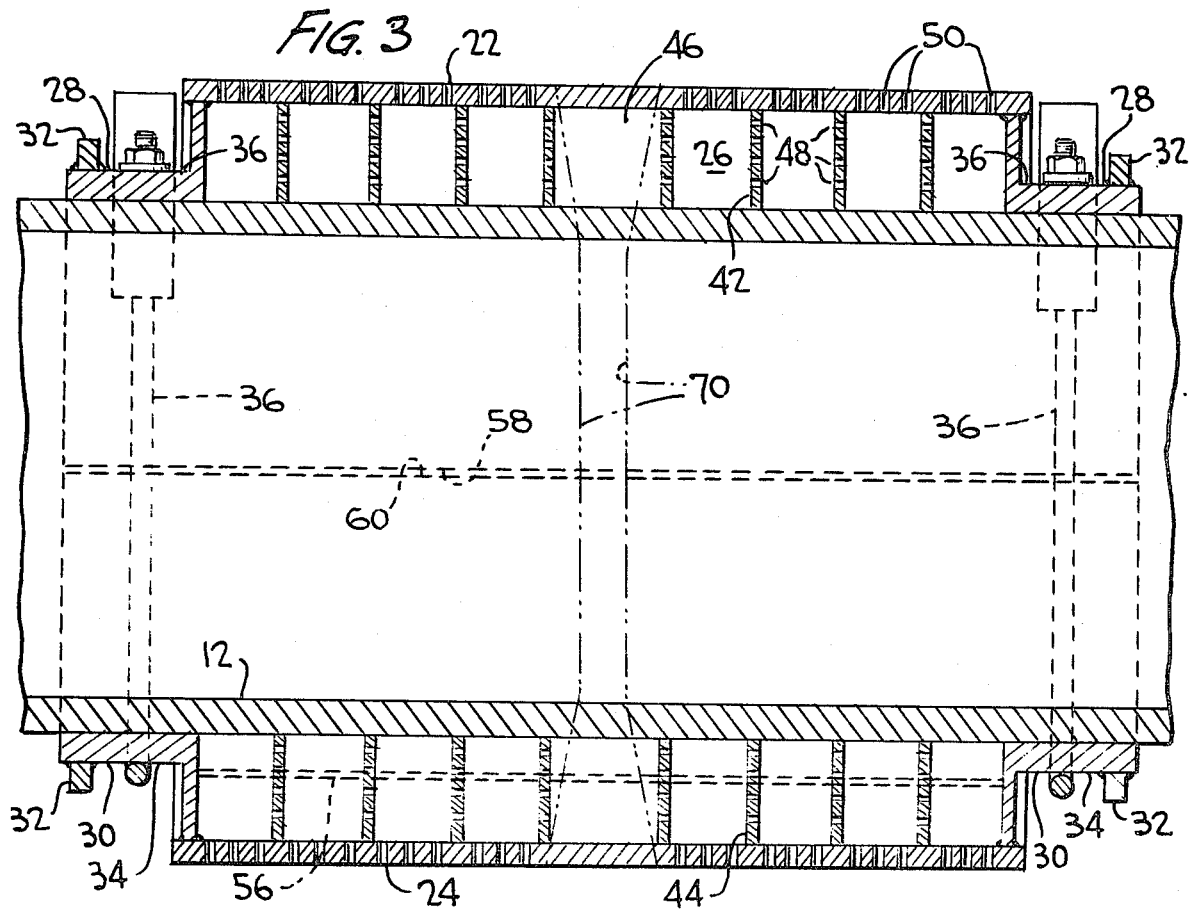

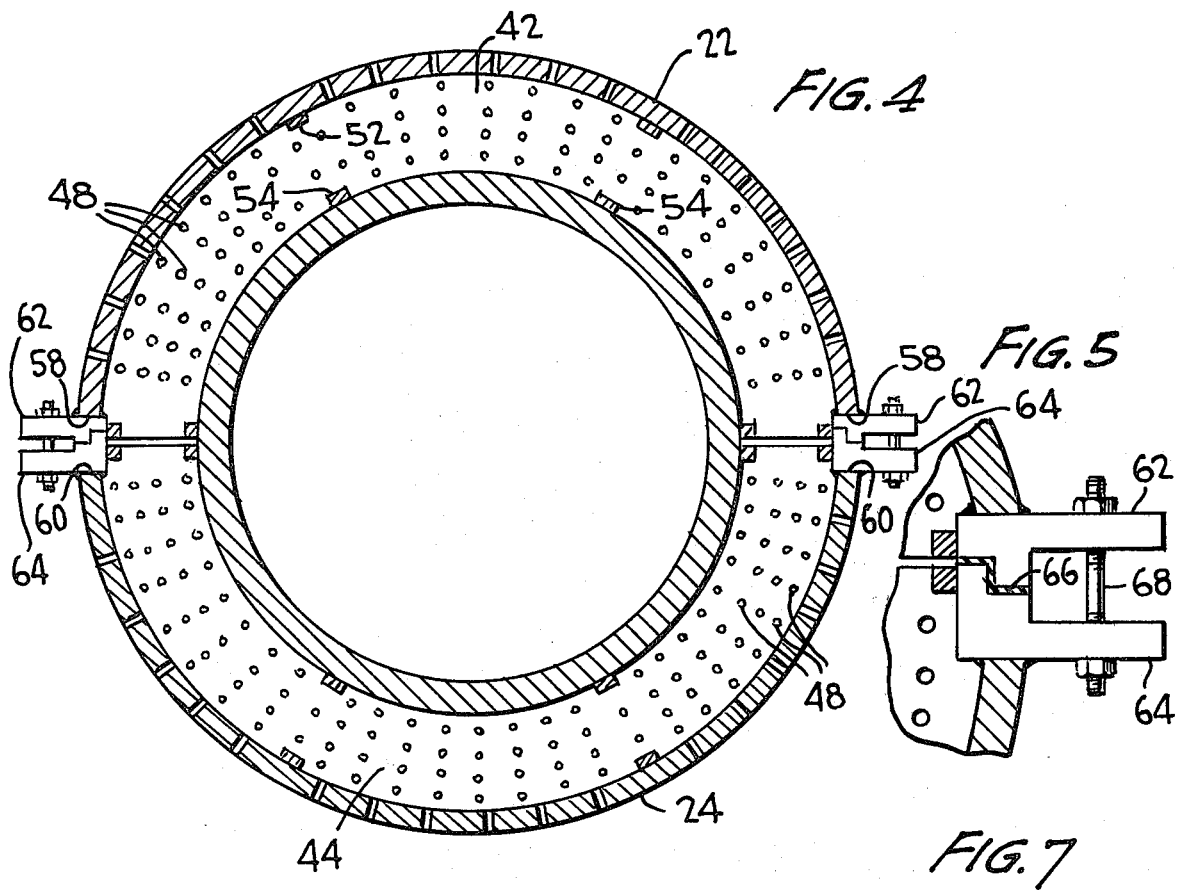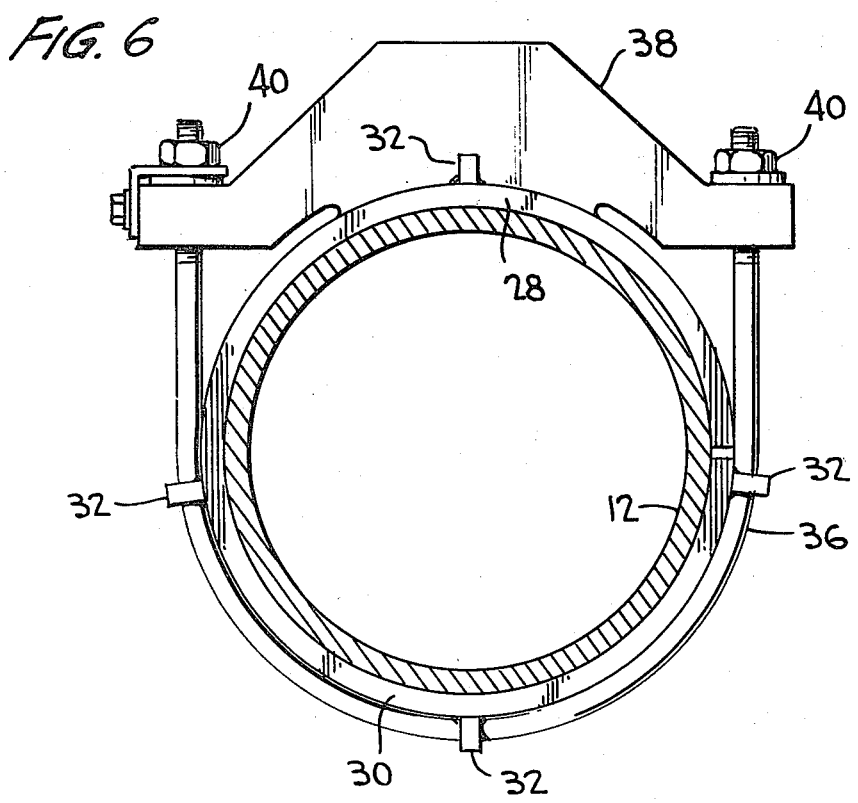

PIPE RUPTURE RESTRAINT AND JET SHIELD DIFFUSER ASSEMBLY

BACKGROUND OF THE INVENTION

1. Field of the Invention

The present invention pertains to an assembly for preventing damage upon rupture of a pipe and, more particularly, to a pipe rupture restraint and jet shield diffuser assembly controlling pipe rupture at the point of rupture.

2. Discussion of the Prior Art

It is important from a safety standpoint that components of various systems incorporating flow pipes, such as nuclear power plants, be protected against dynamic effects resulting from the effects of pipe whip and jet flow upon rupture of the pipes. When a break in a pipe occurs, it is common practice to assume that the pipe will separate at the break location allowing a fluid jet to fully develop in space creating the effects of pipe whip and fluid jet flow. Accordingly, the essential components of the system have, in the past, been protected using pipe rupture restraints and jet shields. That is, it has been the practice in the past to provide such protection against pipe whip and/or jet-component interaction by protecting the targets upon which the pipe and/or jet would impact upon rupture; however, this has the disadvantages of requiring protection of many secondary targets which are not in the initial interaction but might become targets because of deflected jets, of requiring shields to be provided for components which are almost impossible to protect, such as containment and penetration liners, and of permitting damage from reaction loads on equipment.

SUMMARY OF THE INVENTION

Accordingly, it is a primary object of the present invention to overcome the above mentioned disadvantages of the prior art by controlling pipe ruptures at the source rather than protecting targets subjected to impact upon pipe rupture.

Another object of the present invention is to protect safety related components from the effects of jet impingement upon postulated ruptures in a flow pipe by utilizing a pipe rupture restraint and jet shield diffuser assembly either supported by the pipe or independently supported, the assembly including diffuser rings forming flow obstructions within a perforated casing which pressurizes sufficiently to induce substantially uniform multidirectional dispersion of the jet flow from pipe rupture thereby reducing jet intensity.

A further object of the present invention is to utilize a jet shield diffuser at locations where a pipe is subject to rupture to contain pipe separation which eliminates the development of full axial fluid jet thrust and thereby reduces dynamic load factors.

The present invention has an additional object in that a pipe rupture restraint and jet shield diffuser assembly is formed of a perforated cylindrical casing defining a limited annular space around a pipe to be protected and a plurality of diffuser rings disposed in longitudinally spaced relation in the annular space, the diffuser rings permitting flow thereby through holes or around inner and/or outer edges to define flow obstructions in the annular space such that, upon rupture of the pipe, jet flow is diffused by flow past the diffuser rings and through the perforations in the casing.

Some of the advantages of the present invention over the prior art are that, by controlling pipe rupture separation and diffusing jet flow therefrom, consideration of secondary targets is not required, shields are not required for components which are difficult to protect, reaction forces in the rupture pipe are controlled, the reaction loads on penetrations and other components in the piping system are reduced, and the effort required for locating and designing restraints and shields is reduced.

The present invention is generally characterized in a pipe rupture restraint and jet shield diffuser assembly for installation on a pipe at a location where the pipe is subject to rupture including a cylindrical casing surrounding the pipe to define an annular space therebetween, the casing having holes therethrough extending substantially transverse to the longitudinal axis of the casing, and a plurality of diffuser rings disposed in longitudinally spaced relation in the annular space to form flow obstructions along the annular space whereby upon rupture of the pipe, jet flow is diffused by flow past the diffuser rings and through the holes in the casing.

Other objects and advantages of the present invention will become apparent from the following description of the preferred embodiment taken in conjunction with the accompanying drawings.

BRIEF DESCRIPTION OF THE DRAWINGS

FIG. 1 is a diagram of a flow system incorporating pipe rupture restraint and jet shield diffuser assemblies according to the present invention.

FIG. 2 is a broken section of a pipe rupture restraint and jet shield diffuser assembly according to the present invention.

FIG. 3 is a longitudinal section of the pipe rupture restraint and jet shield diffuser assembly of FIG. 2.

FIG. 4 is a section taken along line 4—4 of FIG. 2.

FIG. 5 is a broken view of a clamping assembly for the pipe rupture restraint and jet shield diffuser of the present invention.

FIG. 6 is a section taken along line 6—6 of FIG. 2.

FIG. 7 is a side view of the yoke clamp of FIG. 6.

DESCRIPTION OF THE PREFERRED EMBODIMENT

Figure 8:
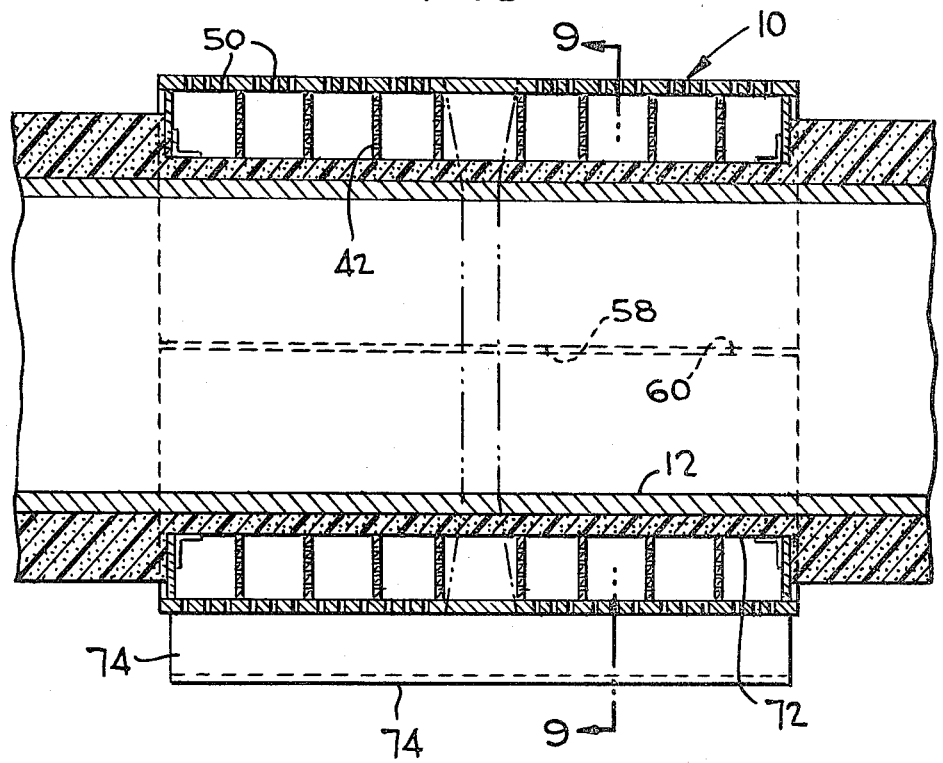
FIG. 8 is a longitudinal section of an independently supported pipe rupture restraint and jet shield diffuser assembly according to the present invention.

A process pipe flow system utilizing a plurality of pipe rupture restraint and jet shield diffuser assemblies 10 according to the present invention is illustrated in FIG. 1, the system including a process pipe 12 penetrating through a containment building wall 14 and passing by bumpers 16 to penetrate a wall 18 prior to terminating at a unit, such as a steam generator 20. The bumpers 16 are positioned to limit movement of the process pipe upon rupture; and, at locations where it is positioned that the process pipe 12 is subject to rupture, such as at welded joints, rupture restraint and jet shield diffuser assemblies 10 are positioned.

As illustrated in FIGS. 2 through 6, the rupture restraint and jet shield diffuser assemblies 10 can be attached directly around the process pipe 12, and each assembly 10 includes a cylindrical casing formed of semi-cylindrical members 22 and 24 surrounding the process pipe 12 to define limited annular space 26 therebetween. The ends of the members 22 and 24 are necked down to form collar portions 28 and 30, respectively, having shear lugs 32 extending therefrom to define channels 34 for receiving yoke members 36 extending around the collars to be bolted to a yoke beam 38 via nuts 40.

Disposed within the annular space 26 are a plurality of perforated diffuser rings formed of semi-circular members 42 and 44, the diffuser rings being disposed in longitudinal spaced relation to define annular chambers therebetween with one of the chambers 46 being aligned with a point of postulated rupture of the pipe 12. The holes or perforations 48 in the diffuser rings extend in substantially parallel relation to the longitudinal axis of the casing while the casing has holes or perforations 50 extending substantially transverse to the longitudinal axis of the casing to communicate with the annular chambers between the diffuser rings with the exception that the annular chamber 46 aligned with the point of postulated rupture of the pipe 12 is solid to prevent flow therethrough. Stiffeners 52 and 54 are welded to the diffuser rings to maintain the alignment thereof; and, if desired, additional stiffeners can be welded to the diffuser rings, as illustrated at 56 at dashed lines. The casing members 22 and 24 have longitudinal edges 58 and 60 on opposite sides thereof, respectively, with flanges 62 and 64 extending from edges 58 and 60, respectively, the flanges having stepped portions for pressing a sealing gasket 66 therebetween, as best illustrated in FIG. 5. The flanges are clamped together by means of bolts 68 forcing the flanges together in sealing relation with the gasket.

In operation, each pipe rupture restraint and jet shield diffuser assembly 10 will be disposed at a postulated point of rupture of the process pipe 12, such as at welded joints thereof; and, should the pipe 12 be ruptured at this point, longitudinal movement of the pipe will be limited by engagement with the bumpers 16 such that separation of the pipe is limited, as illustrated by dashed lines 70, thereby causing initial jet flow into annular chamber 46 which has a solid casing portion associated therewith such that flow is forced through holes 48 in the diffuser rings and through holes 50 in the casing as the flow passes along the annular space. Accordingly, the perforated casing pressurizes sufficiently to induce substantially uniform multidirectional dispersion of the fluid jet from the ruptured pipe to reduce the jet intensity while the thrust pulse resulting from the sudden pressure drop at the initial moment of pipe rupture is minimized along with the thrust transient resulting from wave propagation and reflection, and the blowdown thrust resulting from buildup of the discharge flow rate is reduced. If the pipe rupture location is near a penetration through a wall, the penetration reaction load can be reduced by controlling thrust parameters. By controlling hole size in the diffuser rings, the pressure drop across the rupture can be reduced; and, since the pipe will not have a total separation, jet impulse or impingement will not reach full strength thereby reducing dynamic load factors and limiting the pipe separation gap. With the assembly 10 directly attached to the process pipe 12, the weight effect of the assembly 10 must be included when pipe stress analysis is prepared. With the diffuser rings disposed in the annular space between the casing and the pipe, the diffuser rings effectively eliminate acceleration gap of the additional kinetic energy which would have to be absorbed thereby resulting in lower impact loads and thinner casings. The ends of the casing can be solid such that no flow will exit the assembly parallel to the longitudinal axis of the casing or a controlled gap can be provided between the pipe and the diffuser assembly 10 to permit a desired flow therethrough.

Figure 9:
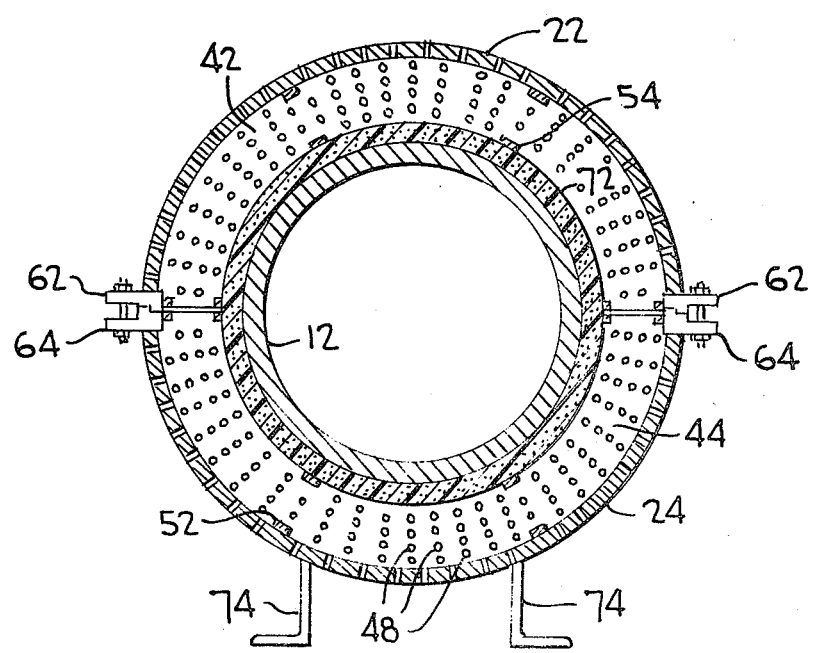
FIG. 9 is a section taken along line 9—9 of FIG. 8.

In the embodiment of FIGS. 8 and 9, the pipe rupture restraint and jet shield diffuser assembly 10 is illustrated as being independently supported; and, in this case, the installation gap between the process pipe 12 and the assembly 10 has to take into account thermal and seismic displacement along with a thickness of high efficiency insulation 72. The structure of the assembly 10 including the casing and the diffuser rings in the embodiment of FIGS. 8 and 9 is the same as that previously described with respect to the embodiment of FIGS. 2 through 6 with the exception that collars are not provided on the ends of the casing but rather the casing is supported via legs 74 depending from the casing.

The operation of the embodiment of FIGS. 8 and 9 for diffusing flow upon rupture of the pipe 12 at a postulated break location is the same as that described above in that flow will initially be forced through the holes in the diffuser rings and out of the assembly 10 via the holes in the casing.

Figure 10:
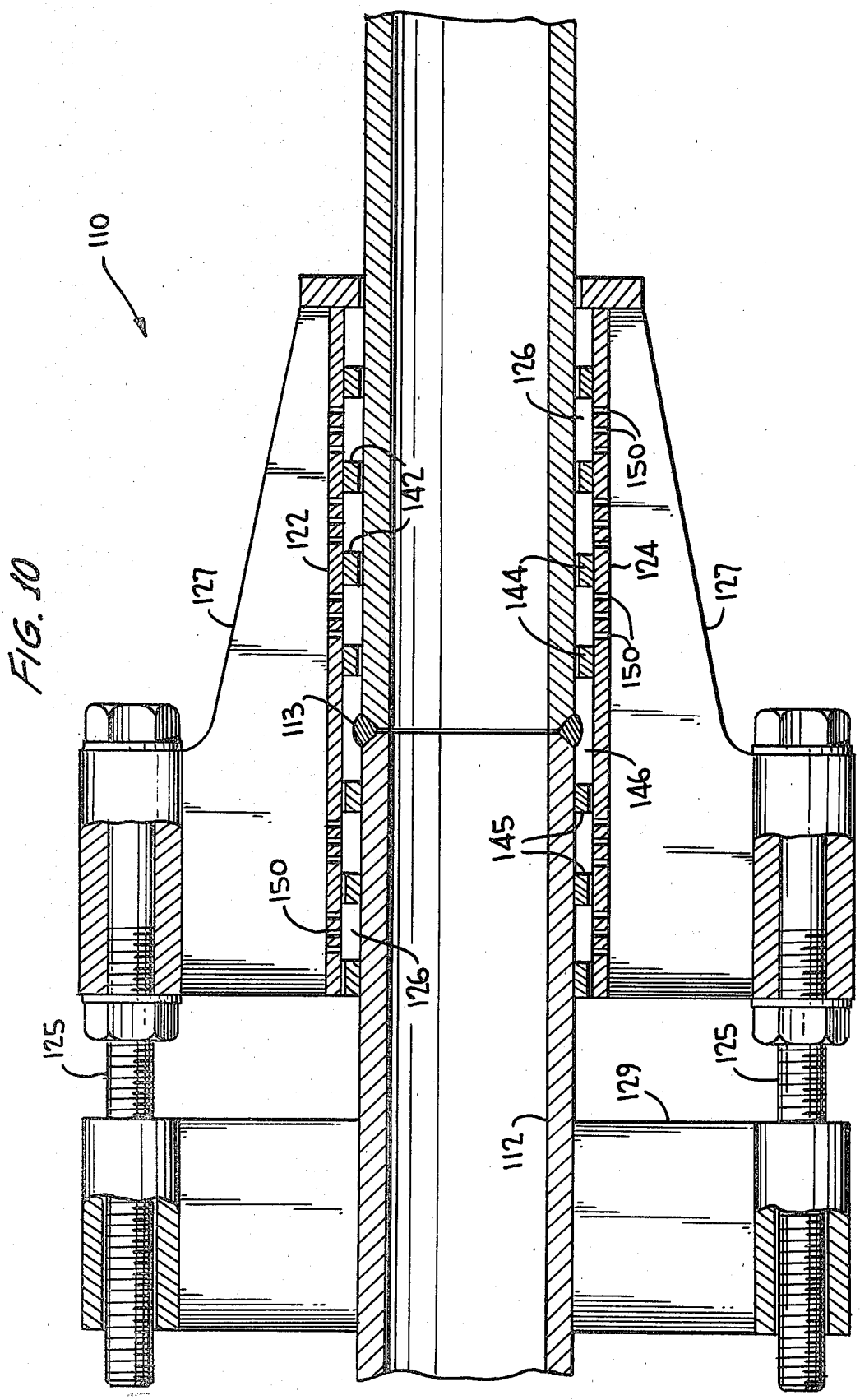
FIG. 10 is a longitudinal section of another embodiment of a pipe rupture restraint and jet shield diffuser assembly according to the present invention.

Another embodiment of a pipe rupture restraint and jet shield diffuser assembly 110 according to the present invention is illustrated in FIG. 10 and parts similar to parts of the pipe rupture restraint and jet shield diffuser assembly 10 previously described are given the same reference numbers with 100 added. A pipe 112 has a welded joint 113; and, since the joint 113 represents a postulated break point, the pipe rupture restraint and jet shield diffuser assembly 110 is installed over the joint, the assembly 110 including a cylindrical casing formed of semi-cylindrical members 122 and 124 surrounding the pipe 112 to define a limited annular space 126 therebetween. The members 122 and 124 are clamped in place on the pipe 112 by bolts 125 passing through radially extending wings 127 to be received in a collar 129 mounted on the pipe.

Within annular space 126 are a plurality of longitudinally spaced diffuser rings formed of segments 142 and 144 welded to casing members 122 and 124, respectively. The diffuser rings are arranged such that their inner edges are spaced from the pipe 112 to permit flow thereby and the longitudinal spacing of the diffuser rings defines annular chambers communicating with holes 150 in the casing. As illustrated on the left side of the joint 113, diffuser rings 145 can also be welded directly to the pipe 12 such that the outer edges thereof are spaced from the casing to permit flow thereby and out via the casing holes 150. An annular chamber 146 has a solid casing wall associated therewith with no holes therein and is aligned with the joint 113 such that upon pipe rupture, jet flow will be deflected laterally along the annular space 146.

The operation of the pipe rupture restraint and jet shield diffuser assembly 110 is the same as that previously described with respect to assembly 10 with the exception that flow obstructions are formed by the diffuser rings being spaced either from the casing or from the pipe rather than by perforations or holes as in the previous embodiment. It will be appreciated that the diffuser rings can be formed either entirely on the casing or on the pipe or the assembly can incorporate diffuser rings secured to both the casing and the pipe.

Inasmuch as the present invention is subject to many variations, modifications and changes in detail, it is intended that all subject matter discussed above or shown in the accompanying drawings be interpreted as illustrative and not in a limiting sense.

What is claimed is:

1. A pipe rupture restraint and jet shield diffuser assembly for installation on a pipe at a location where the pipe is subject to rupture comprising a cylindrical casing surrounding the pipe to define an annular space therebetween, said casing having holes therethrough extending substantially transverse to the longitudinal axis of said casing; and a plurality of diffuser rings disposed in longitudinally spaced relation in said annular space to form flow obstructions along said annular space whereby upon rupture of the pipe jet flow is diffused by flow past said diffuser rings and through said holes in said casing.

2. A pipe rupture restraint and jet shield diffuser assembly as recited in claim 1 wherein said diffuser rings define annular chambers therebetween with one of said chambers aligned with a point of postulated rupture of the pipe, said one chamber having a portion of said casing defining a solid wall of said one chamber.

3. A pipe rupture restraint and jet shield diffuser assembly as recited in claim 2 wherein said chambers other than said one chamber have portions of said casing associated therewith with said holes extending therethrough.

4. A pipe rupture restraint and jet shield diffuser assembly as recited in claim 1 wherein said casing has collars on the ends thereof engaging the pipe.

5. A pipe rupture restraint and jet shield diffuser assembly as recited in claim 4 and further comprising yoke members clamping said collars to the pipe.

6. A pipe rupture restraint and jet shield diffuser assembly as recited in claim 5 wherein said collars have spaced shear lugs extending therefrom defining channels for receiving said yoke members.

7. A pipe rupture restraint and jet shield diffuser assembly as recited in claim 1 wherein said casing is formed of a pair of semi-cylindrical members, and said diffuser rings are each formed of a pair of semi-circular members.

8. A pipe rupture restraint and jet shield diffuser assembly as recited in claim 7 wherein said casing members have longitudinal edges with flanges extending radially therefrom and further comprising sealing gaskets disposed between adjacent flanges and clamping means forcing said flanges together in sealing relation with said gasket.

9. A pipe rupture restraint and jet shield diffuser assembly as recited in claim 7 and further comprising stiffener means secured to said diffuser rings and extending through said annular space in parallel relation with the longitudinal axis of said casing.

10. A pipe rupture restraint and jet shield diffuser assembly as recited in claim 1 and further comprising a layer of insulation material disposed between the pipe and said diffuser rings.

11. A pipe rupture restraint and jet shield diffuser assembly as recited in claim 10 and further comprising legs depending from said casing for supporting said assembly.

12. A pipe rupture restraint and jet shield diffuser assembly as recited in claim 1 and further comprising stiffener means secured to said diffuser rings and extending through said annular space in parallel relation with the longitudinal axis of said casing.

13. A pipe rupture restraint and jet shield diffuser assembly as recited in claim 1 wherein said diffuser rings have holes therethrough extending in substantially parallel relation with the longitudinal axis of said casing.

14. A pipe rupture restraint and jet shield diffuser assembly as recited in claim 1 wherein said diffuser rings have inner edges spaced from the pipe to permit flow therearound.

15. A pipe rupture restraint and jet shield diffuser assembly as recited in claim 1 wherein said diffuser rings have outer edges spaced from said casing to permit flow therearound.

16. A pipe rupture restraint and jet shield diffuser assembly as recited in claim 1 wherein some of said diffuser rings have inner edges spaced from the pipe to permit flow therearound and others of said diffuser rings have outer edges spaced from said casing to permit flow therearound.

* * * * *